US012163271B2

(12) United States Patent
Chiorino et al.

(10) Patent No.: US 12,163,271 B2
(45) Date of Patent: *Dec. 10, 2024

(54) SPRAY SYSTEM FOR AN APPLIANCE HAVING A FLEXIBLE SPRAY MEMBRANE HAVING A SEPARABLE SEAM

(71) Applicant: WHIRLPOOL CORPORATION, Benton Harbor, MI (US)

(72) Inventors: Carlo Chiorino, Fabriano (IT); Mauro Mancini, Fabriano (IT)

(73) Assignee: Whirlpool Corporation, Benton Harbor, MI (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/891,414

(22) Filed: Aug. 19, 2022

(65) Prior Publication Data

US 2022/0389643 A1 Dec. 8, 2022

Related U.S. Application Data

(63) Continuation of application No. 16/811,544, filed on Mar. 6, 2020, now Pat. No. 11,466,393.

(51) Int. Cl.

| | |
|---|---|
| ***D06F 39/08*** | (2006.01) |
| ***B05B 15/528*** | (2018.01) |
| ***D06F 37/26*** | (2006.01) |

(52) U.S. Cl.

CPC .......... *D06F 39/088* (2013.01); *B05B 15/528* (2018.02); *D06F 37/266* (2013.01); *D06F 37/267* (2013.01); *D06F 39/083* (2013.01); *D06F 39/085* (2013.01)

(58) Field of Classification Search

CPC .... D06F 37/266; D06F 37/267; D06F 39/083; D06F 39/085; D06F 39/088; B05B 15/528

See application file for complete search history.

(56) References Cited

U.S. PATENT DOCUMENTS

| | | | |
|---|---|---|---|
| 2,402,741 | A | 6/1946 | Draviner |
| 3,220,229 | A | 11/1965 | Livesay |
| 3,237,866 | A | 3/1966 | Lovell |
| 3,286,931 | A | 11/1966 | Webb |

(Continued)

FOREIGN PATENT DOCUMENTS

| | | | |
|---|---|---|---|
| DE | 967808 | C | 12/1957 |
| EP | 1048775 | A1 | 11/2000 |

(Continued)

*Primary Examiner* — Joseph L. Perrin

(74) *Attorney, Agent, or Firm* — Price Heneveld LLP

(57) ABSTRACT

A recirculating fluid flow system for an appliance includes a fluid pump that delivers process fluid through a fluid path. A tub is disposed within a cabinet and defines a processing space. The fluid path includes at least a portion of the processing space. The tub has an outlet that directs the process fluid toward the fluid pump. A sprayer assembly is coupled with the tub for directing the process fluid into the processing space. The sprayer assembly includes a spray head having a plurality of spray nozzles and an operable seam that extends through each spray nozzle of the plurality of spray nozzles. The operable seam is selectively separable to define a release opening that includes at least two spray nozzles of the plurality of spray nozzles.

20 Claims, 9 Drawing Sheets

(56) References Cited

U.S. PATENT DOCUMENTS

| | | | |
|---|---|---|---|
| 3,288,371 | A | 11/1966 | Broughton |
| 7,513,655 | B2 | 4/2009 | Chang |
| 7,516,630 | B2 | 4/2009 | Kim et al. |
| 7,921,493 | B2 | 4/2011 | Kim et al. |
| 7,931,754 | B2 | 4/2011 | Kehl et al. |
| 8,016,444 | B2 | 9/2011 | Cho et al. |
| 9,045,849 | B2 | 6/2015 | Cevikkalp et al. |
| 9,074,760 | B2 | 7/2015 | Dal Ben et al. |
| 9,249,534 | B2 | 2/2016 | Im et al. |
| 9,752,772 | B2 | 9/2017 | Song et al. |
| 9,932,702 | B2 | 4/2018 | Jeong et al. |
| 10,077,523 | B2 | 9/2018 | Im et al. |
| 10,081,023 | B2 | 9/2018 | Valiyambath Krishnan et al. |
| 10,422,064 | B2 | 9/2019 | Seong et al. |
| 11,193,232 | B2 | 12/2021 | Jang et al. |
| 11,208,756 | B2 | 12/2021 | Lee et al. |
| 11,274,391 | B2 | 3/2022 | Seo et al. |
| 2008/0037275 | A1 | 2/2008 | Eblenkamp et al. |
| 2008/0053161 | A1 | 3/2008 | Dahlke et al. |
| 2008/0235880 | A1 | 10/2008 | Kim et al. |
| 2009/0001196 | A1 | 1/2009 | Grez |
| 2010/0108102 | A1 | 5/2010 | Kehl et al. |
| 2014/0033449 | A1 | 2/2014 | Im et al. |
| 2014/0069152 | A1 | 3/2014 | Song et al. |
| 2014/0075683 | A1 | 3/2014 | Kim et al. |
| 2014/0352363 | A1* | 12/2014 | Kim ...................... D06F 37/266 239/600 |
| 2015/0135446 | A1 | 5/2015 | Kim et al. |
| 2017/0241060 | A1 | 8/2017 | Seong et al. |
| 2017/0348706 | A1 | 12/2017 | Valiyambath Krishnan et al. |
| 2019/0136438 | A1 | 5/2019 | Lee et al. |
| 2020/0002879 | A1 | 1/2020 | Jang et al. |
| 2020/0141045 | A1 | 5/2020 | Seo et al. |
| 2020/0399817 | A1 | 12/2020 | Tartuferi et al. |
| 2021/0277578 | A1 | 9/2021 | Chiorino et al. |

FOREIGN PATENT DOCUMENTS

| | | | |
|---|---|---|---|
| EP | 1048775 | B1 | 4/2003 |
| EP | 1771618 | A1 | 4/2007 |
| EP | 1793028 | A1 | 6/2007 |
| EP | 1793028 | B1 | 1/2010 |
| EP | 1771618 | B1 | 11/2010 |
| FR | 2240052 | A1 | 3/1975 |
| FR | 2240052 | B1 | 10/1979 |
| WO | 2007069202 | A2 | 6/2007 |
| WO | 2007069202 | A3 | 9/2007 |
| WO | 2011046363 | A2 | 4/2011 |
| WO | 2011046363 | A3 | 6/2011 |

* cited by examiner

SPRAY SYSTEM FOR AN APPLIANCE HAVING A FLEXIBLE SPRAY MEMBRANE HAVING A SEPARABLE SEAM

CROSS-REFERENCE TO RELATED APPLICATION

The present application is a continuation of U.S. patent application Ser. No. 16/811,544 filed Mar. 6, 2020, entitled SPRAY SYSTEM FOR AN APPLIANCE HAVING A FLEXIBLE SPRAY MEMBRANE HAVING A SEPARABLE SEAM, now U.S. Pat. No. 11,466,393, the entire disclosure of which is hereby incorporated herein by reference.

BACKGROUND OF THE DISCLOSURE

The present disclosure generally relates to fluid flow systems, and more specifically, a fluid flow system for an appliance that incorporates a flexible membrane having spray nozzles and a separable seam for expanding the size of the various spray nozzles.

SUMMARY OF THE DISCLOSURE

According to one aspect of the present disclosure, a laundry appliance includes a fluid pump that delivers process fluid through a fluid path. A tub is disposed within a cabinet and a drum that is rotationally operable within the tub. The tub and the drum define a portion of the fluid path. A sprayer assembly is coupled with the tub for directing the process fluid into the drum. A flexible spray head includes spray nozzles. An operable seam extends through the spray head and bisects each of the spray nozzles. The operable seam separates to define a release opening when a blockage within the process fluid is disposed within at least one of the spray nozzles.

According to another aspect of the present disclosure, a recirculating fluid flow system for an appliance includes a fluid pump that delivers process fluid through a fluid path. A tub is disposed within a cabinet and defines a processing space. The fluid path includes at least a portion of the processing space. The tub has an outlet that directs the process fluid toward the fluid pump. A sprayer assembly is coupled with the tub for directing the process fluid into the processing space. The sprayer assembly includes a spray head having a plurality of spray nozzles and an operable seam that extends through each spray nozzle of the plurality of spray nozzles. The operable seam is selectively separable to define a release opening that includes at least two spray nozzles of the plurality of spray nozzles.

According to yet another aspect of the present disclosure, a recirculating fluid flow system for an appliance includes a fluid pump that delivers process fluid and particulate material through a fluid path. A tub is disposed within a cabinet and that defines a processing space. The fluid path includes at least a portion of the processing space. The tub has an outlet that directs the process fluid and the particulate material toward the fluid pump. A sprayer assembly is coupled with the tub for directing the process fluid and particulate material from the fluid pump and into the processing space. The sprayer assembly includes a spray head having spray nozzles and an operable seam that extends through each of the spray nozzles. The operable seam is selectively separable to enlarge an aperture of any of the spray nozzles to define a release opening. The operable seam defines the release opening when a portion of the particulate material is larger than a corresponding aperture of the spray nozzles.

These and other features, advantages, and objects of the present disclosure will be further understood and appreciated by those skilled in the art by reference to the following specification, claims, and appended drawings.

Figure 1:
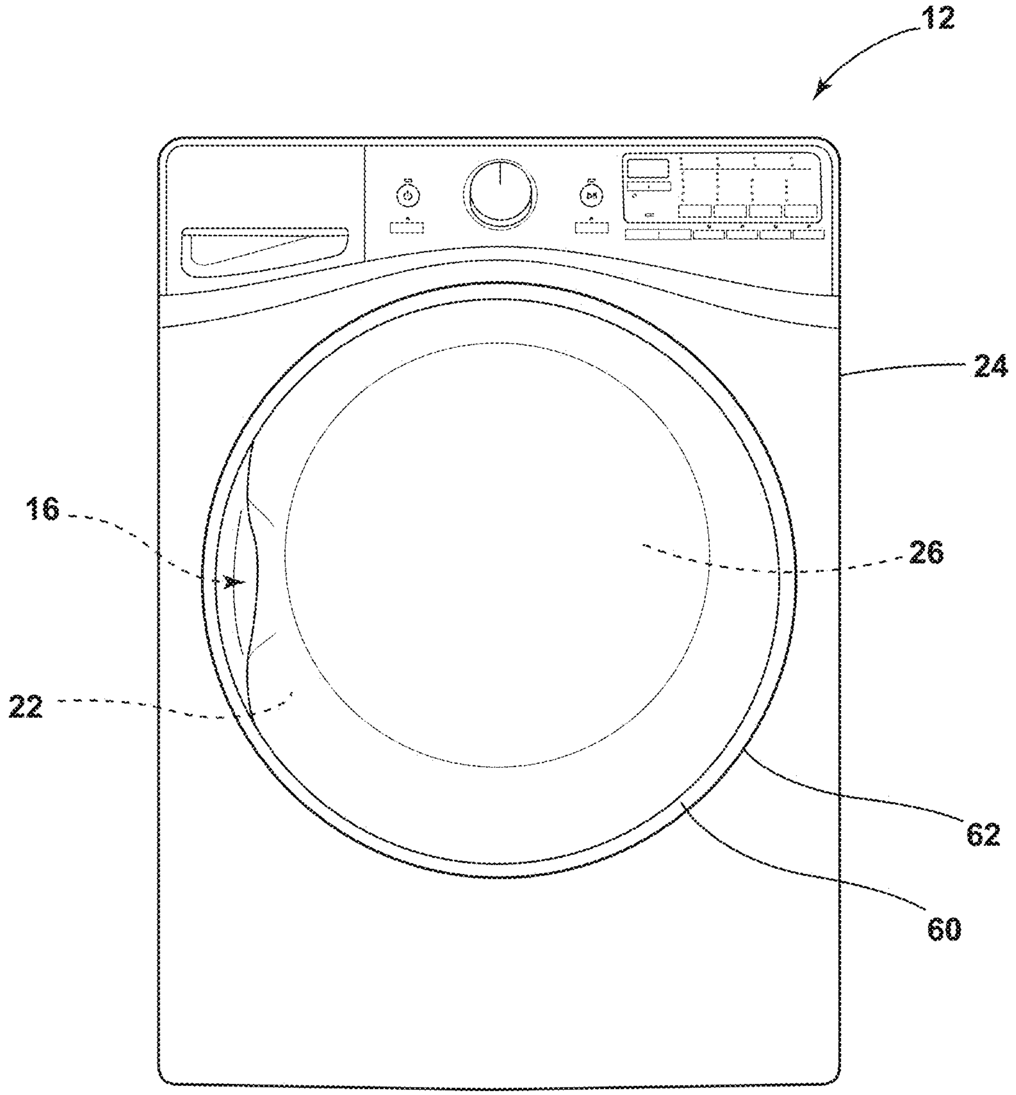
FIG. 1 is a front elevational view of a laundry appliance incorporating an aspect of the recirculating fluid flow system.
Figure 2:
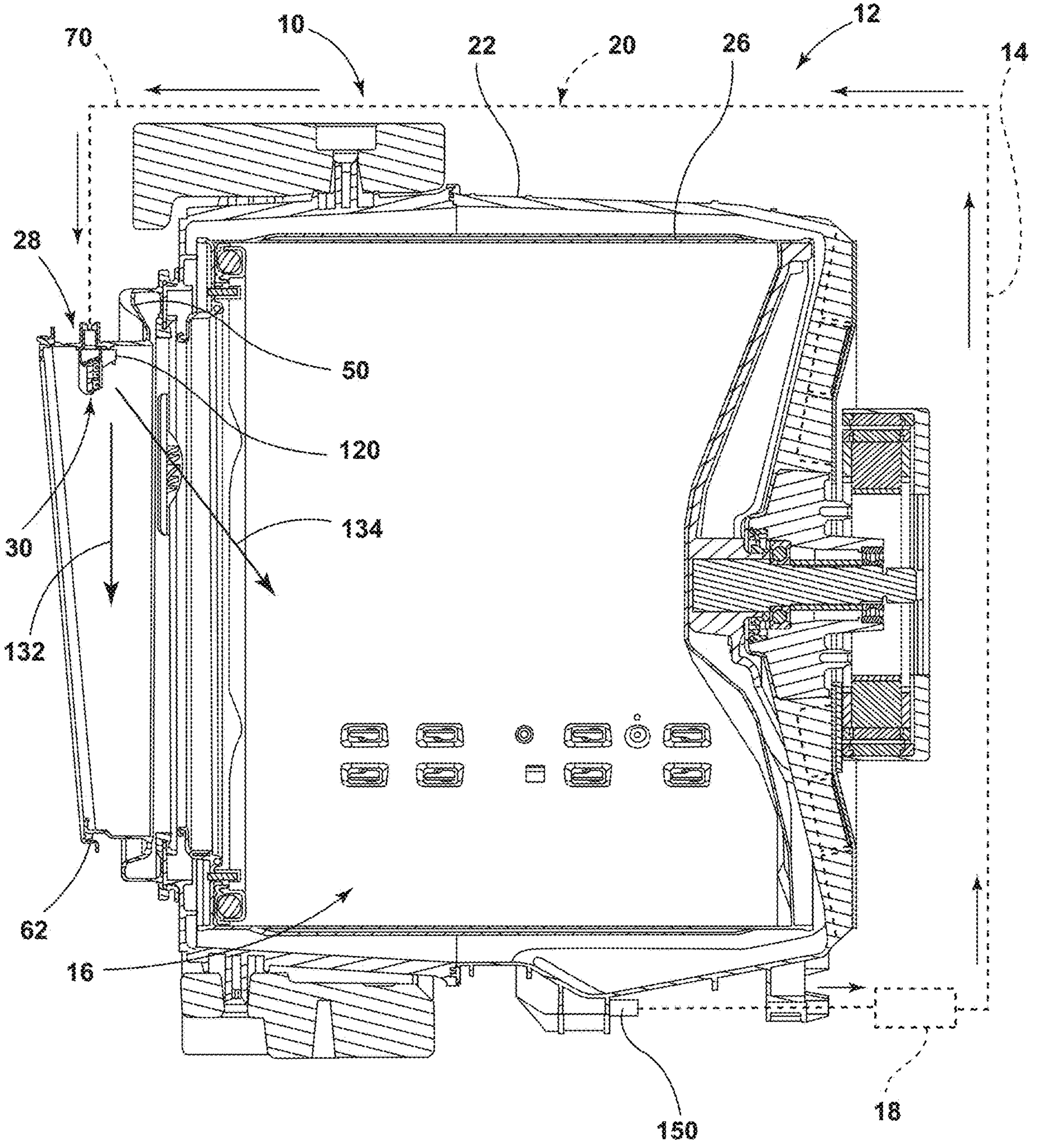
FIG. 2 is a cross-sectional view of a processing space and fluid flow system for a laundry appliance, and incorporating an aspect of the sprayer assembly having the flexible spray head.
Figure 3:
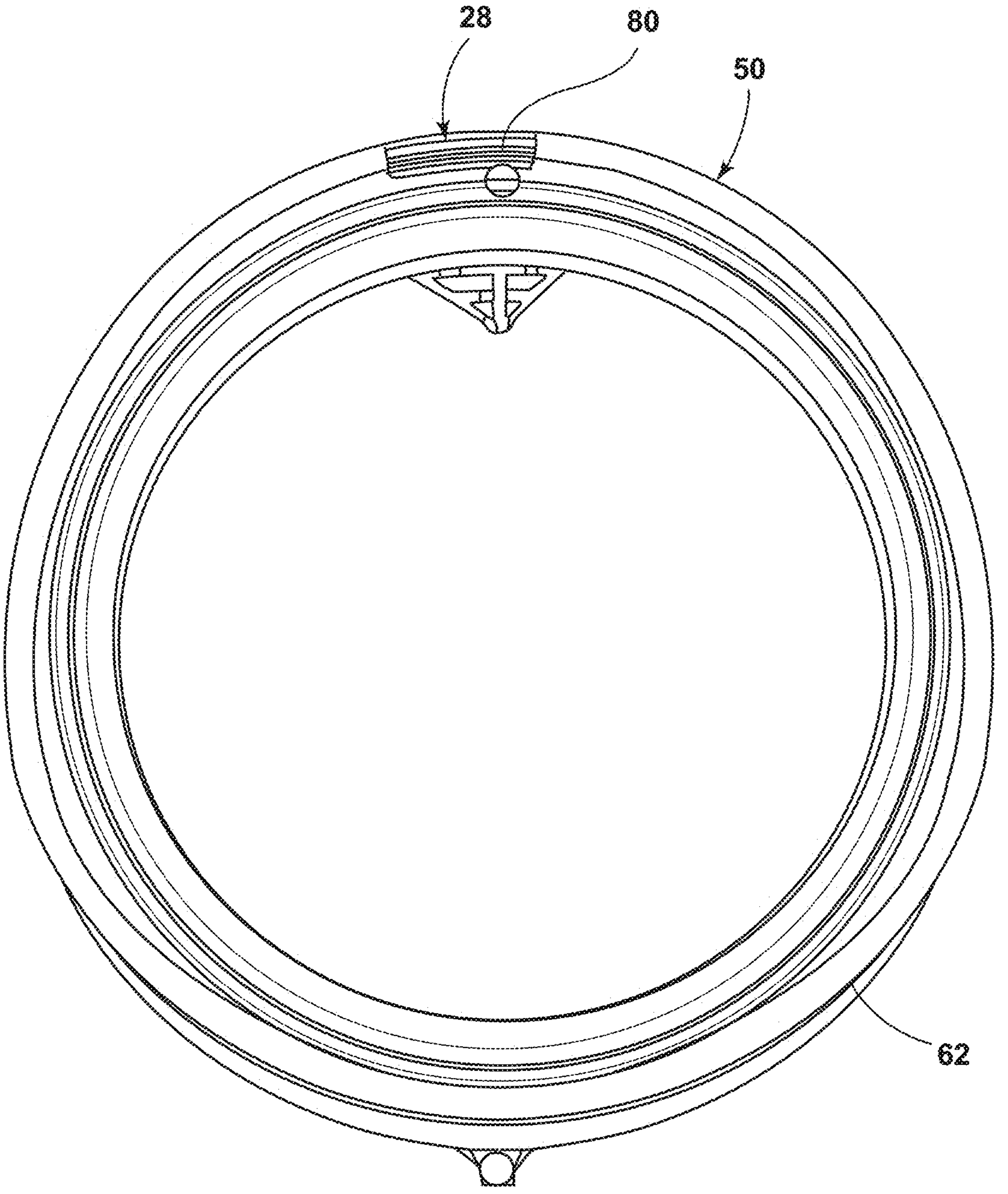
FIG. 3 is a front elevational view of a bellows that extends between a cabinet and a tub for a laundry appliance, and incorporating an aspect of the sprayer assembly having a flexible spray head.
Figure 4:
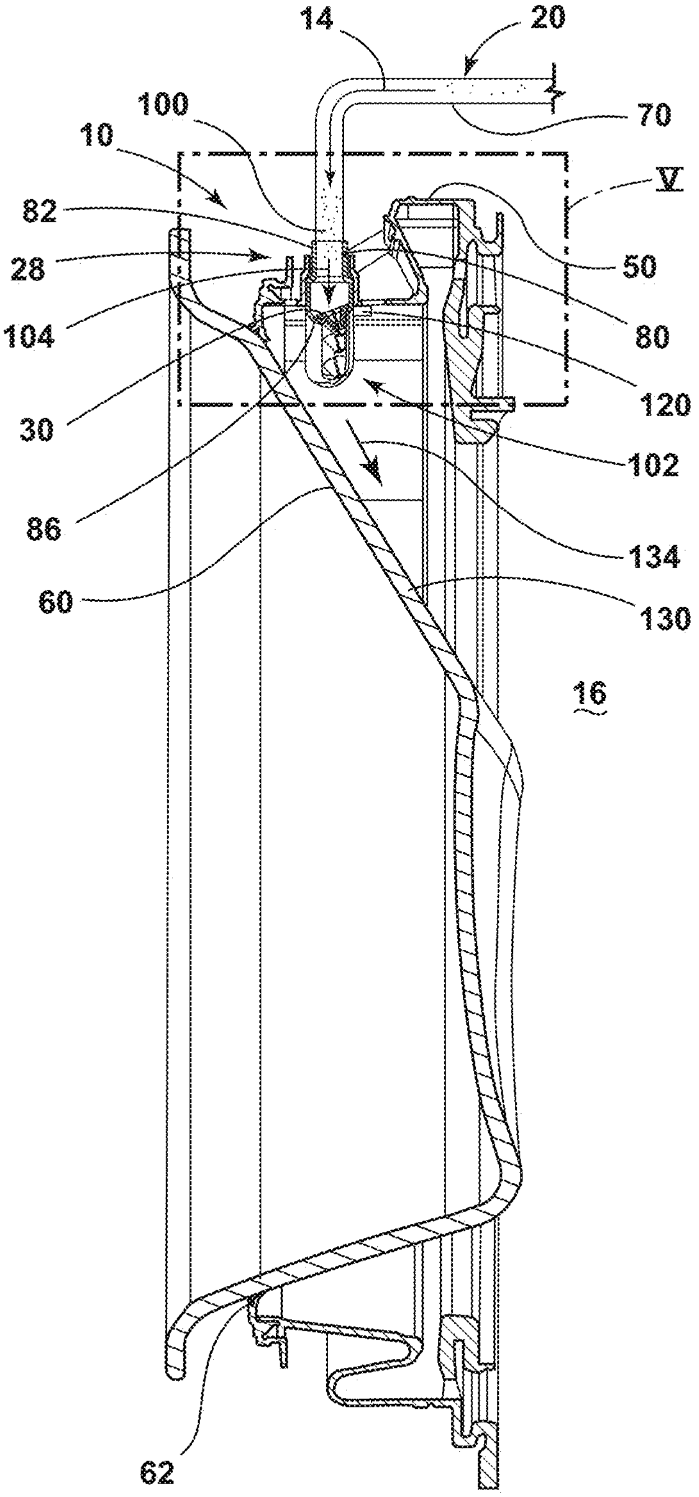
FIG. 4 is a cross-sectional view of the door and bellows assembly of FIG. 3, taken along line IV-IV.
Figure 5:
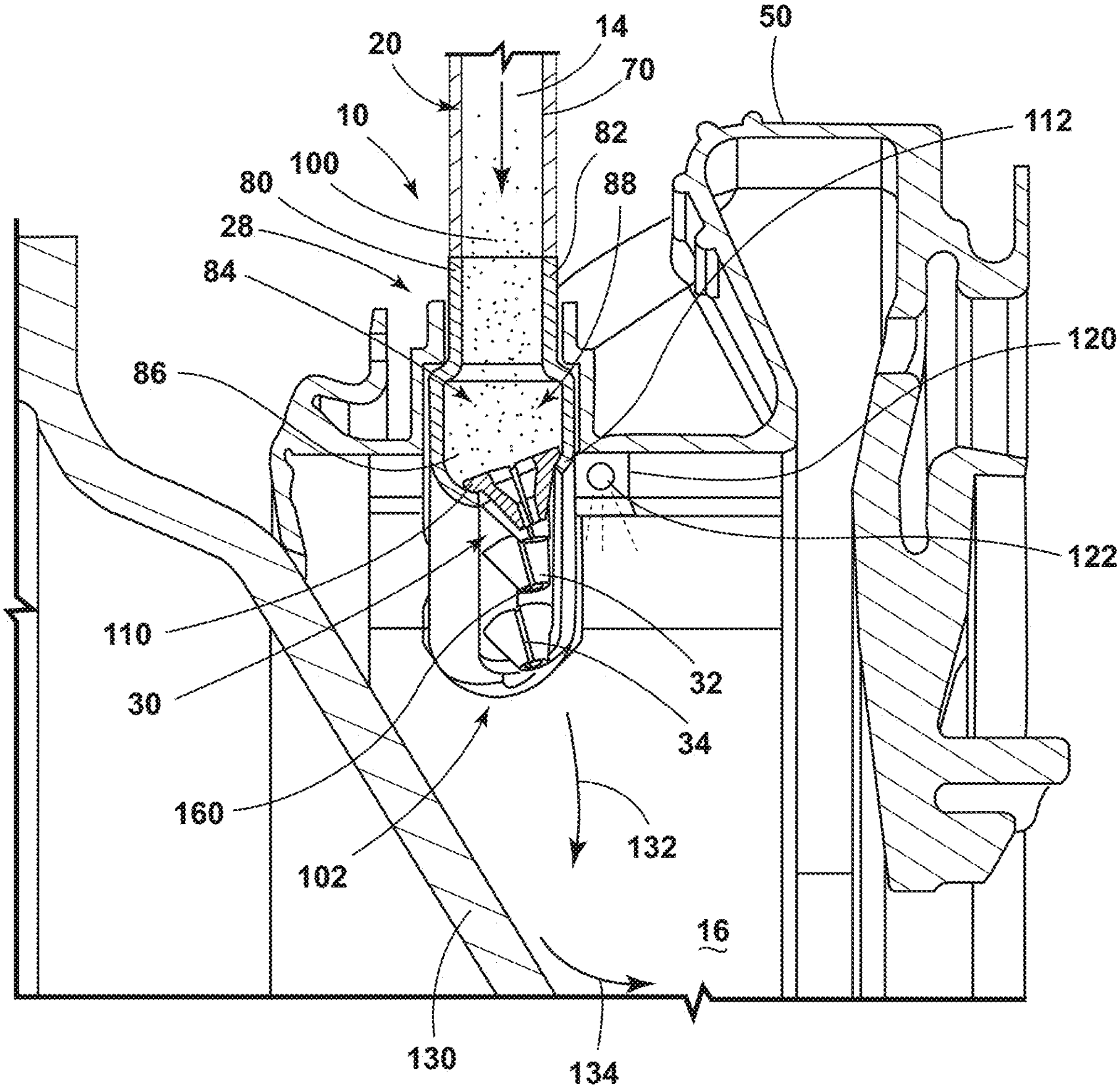
FIG. 5 is an enlarged cross-sectional view of the bellows and door assembly of FIG. 4, taken at area V.
Figure 6:
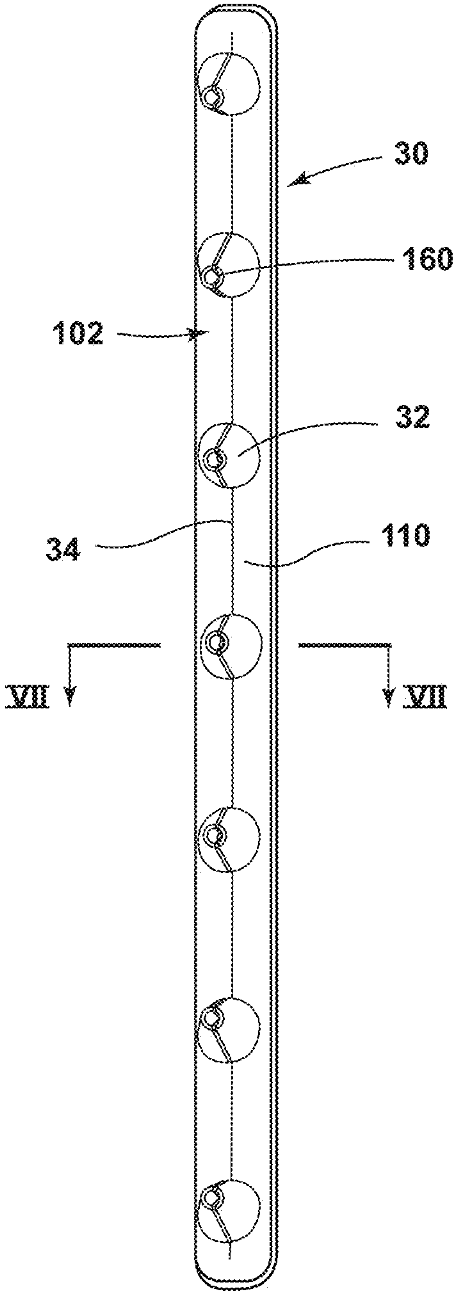
FIG. 6 is a perspective view of an aspect of the flexible spray head for the sprayer assembly.
Figure 7:
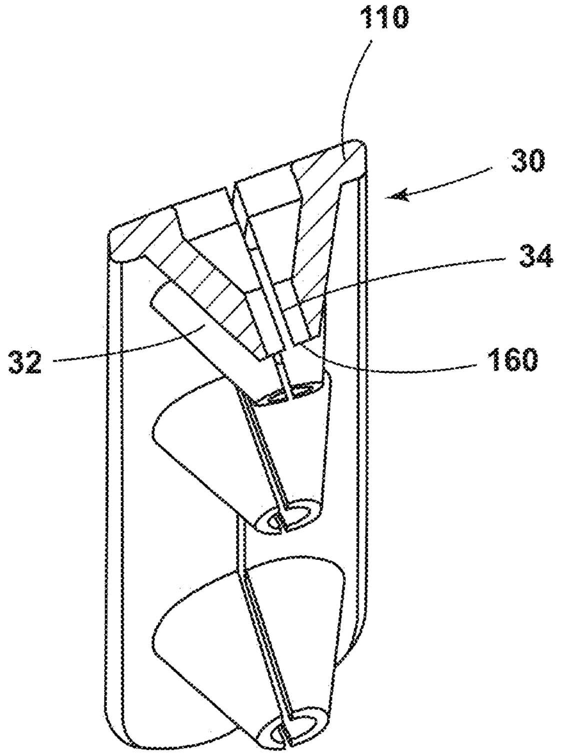
FIG. 7 is a cross-sectional view of the flexible spray head of FIG. 6 taken along line VII-VII.
Figure 8:
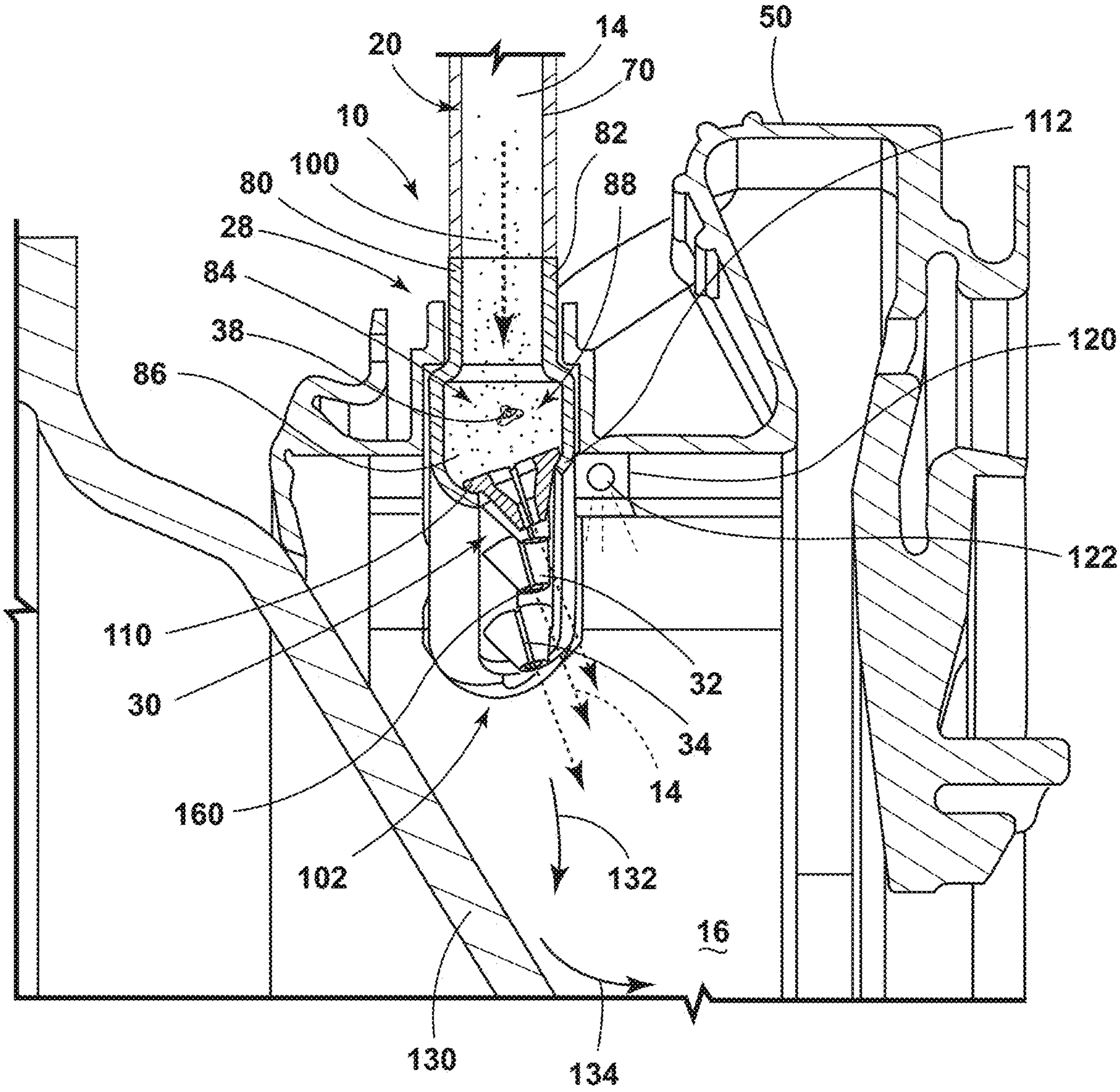
FIG. 8 is a schematic cross-sectional view of the door and bellows assembly of FIG. 5 and showing movement of process fluid through the sprayer assembly and the flexible spray head in a closed position.
Figure 9:
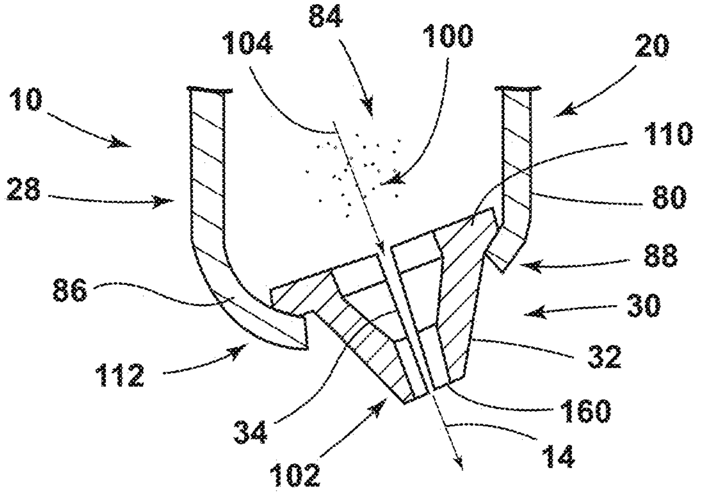
FIG. 9 is a schematic cross-sectional view of an aspect of the flexible spray head and the sprayer assembly, showing the flexible spray head in the closed position.
Figure 10:
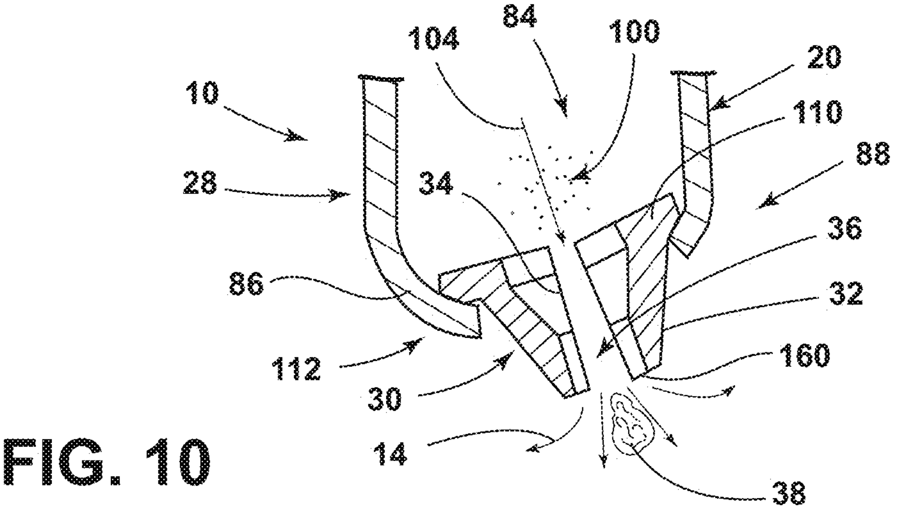
FIG. 10 is a cross-sectional view of the flexible spray head and sprayer assembly showing a partial separation of the seam toward a release position.
Figure 11:
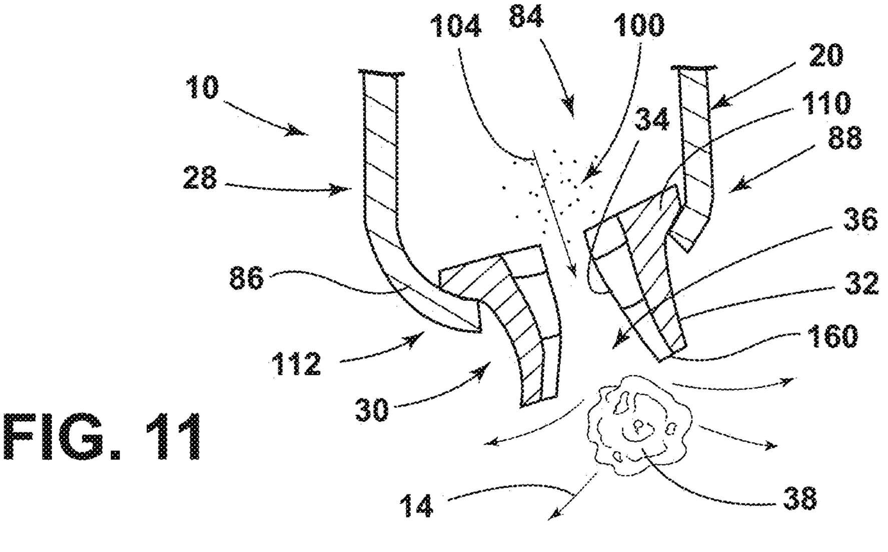
FIG. 11 is a schematic cross-sectional view of the flexible spray head and spray assembly of FIG. 10 showing operation of the flexible spray head to a larger release position to allow passage of a larger blockage.

The components in the figures are not necessarily to scale, emphasis instead being placed upon illustrating the principles described herein.

DETAILED DESCRIPTION

The present illustrated embodiments reside primarily in combinations of method steps and apparatus components related to a recirculating fluid flow system for an appliance that incorporates a flexible spray head having spray nozzles and a separable seam that extends through the spray nozzles for allowing passage of larger blockages that are contained within the recirculated process fluid. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms “upper,” “lower,” “right,” “left,” “rear,” “front,” “vertical,” “horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-11, reference numeral 10 generally refers to a fluid flow system for an appliance 12 that is used to spray process fluid 14 into a processing space 16 for treating various laundry items during operation of the laundry appliance 12. According to various aspects of the device, the laundry appliance 12 can include a fluid pump 18 that delivers process fluid 14 through a fluid path 20. A tub 22 is disposed within a cabinet 24 and a drum 26 is rotationally operable within the tub 22. The tub 22 and the drum 26 define a portion of the fluid path 20. A sprayer assembly 28 is positioned within the tub 22 for directing the process fluid 14 into at least one of the tub 22 and the drum 26. A flexible spray head 30 is included within the sprayer assembly 28. The flexible spray head 30 includes a plurality of spray nozzles 32. An operable seam 34 extends through the flexible spray head 30 and bisects each of the spray nozzles 32. The operable seam 34 selectively separates to define a release opening 36 when a blockage 38 within a process fluid 14 is disposed within at least one of the spray nozzles 32. In this manner, the operable seam 34 can separate to prevent blockages 38 from being lodged within any one or more of the spray nozzles 32, such that a continuous flow of the process fluid 14 can be provided though the sprayer assembly 28 and the flexible spray head 30.

Referring again to FIGS. 2-8, the laundry appliance 12 can also include a bellows 50 that extends between the tub 22 and the cabinet 24. Typically, the sprayer assembly 28 is disposed within or coupled with a portion of the bellows 50. It is also contemplated that the sprayer assembly 28 can be positioned within a portion of the tub 22. The position of the sprayer assembly 28 is typically oriented to position the spray nozzles 32 such that the process fluid 14 can be directed into the processing space 16 defined within the tub 22. The processing space 16 is at least partially contained within the drum 26 that is rotationally operated within the tub 22. The bellows 50 can define a generally flexible member that operates to allow the tub 22 to vibrate within the cabinet 24 during operation of the laundry appliance 12. It is contemplated that the various spray nozzles 32 can be positioned at various angles and orientations within the sprayer assembly 28. The spray nozzles 32 can have a generally similar orientation or can follow a curvature or shape of the sprayer assembly 28 and/or the spray head 30. It is also contemplated that the spray nozzles 32 can be positioned at different orientations for dispensing the process fluid 14 throughout specified areas or a larger portion of the processing space 16.

The bellows 50 provides a flexible interface between the tub 22 and the cabinet 24 to maintain a watertight seal within the processing space 16 of the tub 22. A door 60 of the laundry appliance 12 encloses an aperture 62 within the cabinet 24 that extends into the tub 22 and the processing space 16. By positioning the sprayer assembly 28 within the bellows 50, the sprayer assembly 28 is configured to move along with the movement of the remainder of the bellows 50 during operation of the laundry appliance 12.

According to various aspects of the device, the sprayer assembly 28 can be included within a portion of the bellows 50 near the cabinet 24. In this position, the sprayer assembly 28 may experience less movement during operation of the laundry appliance 12. Typically, the engagement between the bellows 50 and the cabinet 24 experiences little movement during operation of the laundry appliance 12. It should be understood that the sprayer assembly 28 can also be included within other portions of the bellows 50 that receive more movement during operation of the appliance 12. In these locations within the bellows 50, the fluid flow system 10 can include flexible fluid conduits 70 that allows for movement of the sprayer assembly 28, while maintaining a continuous fluid path 20 for the process fluid 14 to be moved therethrough.

Referring now to FIGS. 3-8, the sprayer assembly 28 includes a rigid housing 80 that is seated within the bellows 50. This rigid housing 80 defines a sturdy member within which the flexible spray head 30 can be positioned. The rigid housing 80 can include an input interface 82 that couples with a fluid conduit 70 of the fluid flow system 10. The input interface 82 can include a single interface that allows process fluid 14 to pass into an interior chamber 84 of the rigid housing 80 for distribution throughout the plurality of spray nozzles 32. The rigid housing 80 also includes an output interface 86 that receives and holds the flexible spray head 30 within the rigid housing 80. The output interface 86 of the rigid housing 80 includes an enlarged section 88 that allows for flexion and deflection of the flexible spray head 30 that can result in separation of the operable seam 34 that extends through the flexible spray head 30. As discussed above, as this operable seam 34 separates, a release opening 36 is defined to allow blockages 38 of particulate material 100 to pass therethrough.

As exemplified in FIGS. 3-11, during operation of the laundry appliance 12, it is contemplated that process fluid 14 contained within the processing space 16 can be recirculated through the fluid flow system 10 via the fluid pump 18. During this recirculation process, particulate material 100 is moved within the process fluid 14 for recirculation through the processing space 16 contained within the tub 22. This recirculated process fluid 14 passes through the flexible spray head 30 for distribution into the processing space 16. The particulate material 100 contained within the process fluid 14 may be of a size that can pass through the various spray nozzles 32 while in a closed position 102. In such an instance, deflection of the operable seam 34 is typically minimal as the particulate material 100 can freely flow, or substantially freely flow, through the various spray nozzles 32. Where the particulate material 100 is of a larger size that may be larger than one or more of the spray nozzles 32, the particulate material 100 defines a blockage 38 that may become lodged within one of the spray nozzles 32. In such an instance, a certain amount of fluid back pressure 104 may increase behind the blockage 38. As this back pressure 104 increases, the blockage 38 can bias against the operable seam 34 and cause the operable seam 34 to separate to form the release opening 36. Once the release opening 36 is formed, this blockage 38 is moved through the enlarged release opening 36 of the spray nozzle 32. After the blockage 38 has been moved through the release opening 36 of the operable seam 34, the operable seam 34 is biased toward the closed position 102 to enclose an area of the operable seam 34 between the various spray nozzles 32.

Referring again to FIGS. 5-11, the flexible spray head 30 can include a base 110 that is seated within the output interface 86 of the rigid housing 80. This output interface 86 directs the process fluid 14 for passing through the various spray nozzles 32. The configuration of the rigid housing 80 includes a contoured portion 112 of the output interface 86 that at least partially surrounds the base 110 of the flexible spray head 30. This configuration serves to maintain the flexible spray head 30 within the output interface 86 of the rigid housing 80. This configuration also prevents the flexible spray head 30 from being pushed out of the rigid housing 80 during operation of the laundry appliance 12. In certain aspects of the device, the rigid housing 80 can include fasteners, adhesives, or other mating or interference configurations that hold the base 110 of the flexible spray head 30 within the output interface 86 of the rigid housing 80. These attachments between the base 110 and the rigid housing 80 maintain the position of the flexible spray head 30 within the rigid housing 80 while also allowing the operable seam 34 to separate to form the release opening 36, and re-close to define the closed position 102.

According to various aspects of the device, the rigid housing 80 can include a light fixture 120 having one or more lighting elements 122 that can operate to selectively illuminate the processing space 16 defined within the tub 22 and the drum 26. This light fixture 120 is coupled within the rigid housing 80 and is positioned to provide selective illumination for allowing a user to see into the processing space 16. This light fixture 120 can be operable while the laundry appliance 12 is operating or performing a laundry cycle. The light fixture 120 can also be activated and deactivated when the door 60 is open to allow the user to see into the processing space 16 to insert or remove laundry therefrom.

Referring again to FIGS. 4, 5 and 8, the sprayer assembly 28 can be configured to position the flexible spray head 30 to direct the process fluid 14 in a direction that is toward a deflector 130 defined within the door 60 of the laundry appliance 12. Using this deflector 130, the process fluid 14 can be sprayed in a generally downward direction 132 and then redirected by the deflector 130 into the processing space 16. According to various aspects of the device, the spray nozzles 32 of the flexible spray head 30 can also be oriented to direct the spray of process fluid 14 in an angled direction 134 and directly into the processing space 16. In such an embodiment, residual spray and droplets from the flow of process fluid 14 may be directed off of the deflector 130 and into the processing space 16.

According to various aspects of the device, the fluid flow system 10 can be a recirculating fluid flow system 10 that includes a fluid pump 18 that delivers process fluid 14 through the fluid path 20. The tub 22 is disposed within the cabinet 24 to define a processing space 16. The fluid path 20 includes at least a portion of the processing space 16. The tub 22 includes a fluid outlet 150 that directs the process fluid 14 toward the fluid pump 18. The sprayer assembly 28 is coupled with the tub 22 for directing the process fluid 14 into the processing space 16. The sprayer assembly 28 includes a spray head 30 having a plurality of spray nozzles 32 and an operable seam 34 that extends through each of the spray nozzles 32. The operable seam 34 is selectively separable to define a release opening 36 that includes at least two spray nozzles 32 of the plurality of spray nozzles 32. During operation of the operable seam 34 toward the release position, the operable seam 34 typically separates between two spray nozzles 32. It is contemplated that the operable seam 34 can operate with respect to only a single spray nozzle 32, or more than two spray nozzles 32. If a particularly large blockage 38 is present, or multiple spray nozzles 32 are blocked contemporaneously, the entire operable seam 34 may define a single release opening 36 through which the various blockages 38 can be moved through the sprayer assembly 28.

According to various aspects of the device, the process fluid 14 can include water, laundry chemistries, combinations thereof, particulate material 100, and other similar materials that may be picked up by the process fluid 14 during operation of a particular laundry cycle of the laundry appliance 12. The various laundry chemistries can be injected into the fluid flow system 10 from a chemistry dispenser. It is also contemplated that the various laundry chemistries can be injected into the tub 22 and/or the drum 26. When so injected, these laundry chemistries become part of the recirculated process fluid 14 that moves through the outlet of the tub 22, through the fluid pump 18, and then through the sprayer assembly 28 for recirculation into the processing space 16.

In certain aspects of the device, other fluid handling systems may be placed in communication with the sprayer assembly 28. By way of example, and not limitation, a chemistry dispensing unit, a fluid inlet, a cold water line, a hot water line, combinations thereof and other similar fluid handling systems may be coupled with the sprayer assembly 28 for disposing material into the processing space 16. These various fluid handling systems can be directly coupled to the sprayer assembly 28 or can be attached to the fluid flow system 10 at a position upstream of the sprayer assembly 28.

According to various aspects of the device, when the various processing cycles are completed and recirculation of the process fluid 14 is no longer needed, the fluid pump 18 can be coupled with a diverter valve that redirects the flow of process fluid 14 from toward the sprayer assembly 28, to a separate path toward a fluid outlet 150, water bottle or other similar outlet for ultimate disposal from the appliance 12. It is also contemplated that the fluid flow system 10 for the appliance 12 can include one or more filters for filtering out particulate material 100 having a particular size or larger. In such an embodiment, particles of a smaller size may be moved through the sprayer assembly 28 and the flexible spray head 30 to be delivered into the processing space 16 via the spray nozzles 32 or the release opening 36 defined by the operable seam 34, or both.

According to various aspects of the device, it is contemplated that the flexible spray head 30 may be defined within a portion of the bellows 50, such that the bellows 50 itself includes the spray nozzles 32 and the operable seam 34. In such an embodiment, the rigid housing 80 may surround the flexible spray head 30 so that the process fluid 14 can be directed toward the flexible spray head 30 for delivery into the processing space 16.

Referring again to FIGS. 1-11, the recirculating fluid flow system 10 for the appliance 12 includes the fluid pump 18 that directs process fluid 14 and particulate material 100 through the fluid path 20. The tub 22 is disposed within the cabinet 24, where the tub 22 defines the processing space 16. The fluid path 20 includes at least a portion of the processing space 16. The tub 22 includes an outlet that directs the process fluid 14 and the particulate material 100 toward the fluid pump 18. The sprayer assembly 28 is coupled within the tub 22 for directing the process fluid 14 and the particulate material 100 from the fluid pump 18 and into the processing space 16. As discussed above, the sprayer assembly 28 may be coupled directly to the tub 22, or may be coupled to the tub 22 via a bellows 50 that extends between the tub 22 and the cabinet 24. The sprayer assembly 28 includes the spray head 30 having a plurality of spray nozzles 32 and an operable seam 34 that extends through each of the spray nozzles 32. The operable seam 34 is selectively separable to enlarge a fluid aperture 160 of any one or more of the spray nozzles 32 to define the release opening 36. The operable seam 34 defines the release opening 36 when a portion of the particulate material 100 in the form of a blockage 38, is larger than a corresponding fluid aperture 160 of the plurality of spray nozzles 32.

According to various aspects of the device, the recirculating fluid flow system 10 provides for the movement of process fluid 14 and particulate material 100 in a recirculating manner during operation of a particular laundry cycle for the laundry appliance 12. By recirculating the process fluid 14 and the particulate material 100, the amount of water and chemistry needed during a particular cycle can be limited to only that which is necessary to perform the particular laundry cycle. Additionally, various chemistries can be deposited into the processing space 16 by recirculating water that is already being used within the processing space 16. By recirculating this process fluid 14, additional fluid does not need to be directed into the appliance 12 for accomplishing these ancillary functions.

According to various aspects of the device, the recirculating fluid flow system 10 for the appliance 12 can be incorporated within any one of various appliances 12. These appliances 12 can include, but are not limited to, vertical axis appliances, horizontal axis appliances, washers, dryers, combination washers and dryers, dishwashers, small appliances, and other similar appliances that can utilize a recirculating fluid system.

According to another aspect of the present disclosure, a laundry appliance includes a fluid pump that delivers process fluid through a fluid path. A tub is disposed within a cabinet and a drum that is rotationally operable within the tub. The tub and the drum define a portion of the fluid path. A sprayer assembly is coupled with the tub for directing the process fluid into the drum. A flexible spray head includes spray nozzles. An operable seam extends through the spray head and bisects each of the spray nozzles. The operable seam separates to define a release opening when a blockage within the process fluid is disposed within at least one of the spray nozzles.

According to another aspect, a bellows that extends between the tub and the cabinet, wherein the sprayer assembly is disposed within a portion of the bellows.

According to yet another aspect, the sprayer assembly includes a rigid housing that is seated within the bellows.

According to another aspect of the present disclosure, the rigid housing includes a light fixture that selectively illuminates a processing space defined within the drum.

According to another aspect, the fluid path is configured to recirculate process fluid through the drum and the sprayer assembly.

According to yet another aspect, the process fluid includes particulate material accumulated during a laundry cycle. The sprayer assembly is configured to allow passage of the particulate material through at least one of the spray nozzles and the release opening.

According to another aspect of the present disclosure, the operable seam is biased toward a closed position that encloses and area of the operable seam between the spray nozzles.

According to another aspect, the flexible spray head includes a base that is seated within an aperture of the rigid housing.

According to yet another aspect, a recirculating fluid flow system for an appliance includes a fluid pump that delivers process fluid through a fluid path. A tub is disposed within a cabinet and defines a processing space. The fluid path includes at least a portion of the processing space. The tub has an outlet that directs the process fluid toward the fluid pump. A sprayer assembly is coupled with the tub for directing the process fluid into the processing space. The sprayer assembly includes a spray head having a plurality of spray nozzles and an operable seam that extends through each spray nozzle of the plurality of spray nozzles. The operable seam is selectively separable to define a release opening that includes at least two spray nozzles of the plurality of spray nozzles.

According to another aspect of the present disclosure, the operable seam selectively defines the release opening when a blockage of the process fluid is disposed within at least one spray nozzle of the plurality of spray nozzles.

According to another aspect, the plurality of spray nozzles is disposed within a flexible spray head that is operably positioned within a rigid housing.

According to yet another aspect, a bellows extends between the tub and the cabinet, wherein the sprayer assembly is disposed within a portion of the bellows.

According to another aspect of the present disclosure, the rigid housing includes a light fixture that selectively illuminates a portion of the processing space.

According to another aspect, the fluid path is configured to recirculate process fluid through the sprayer assembly and the tub.

According to yet another aspect, the process fluid includes particulate material accumulated during a laundry cycle. The sprayer assembly is configured to allow passage of the particulate material through at least one spray nozzle of the plurality of spray nozzles and the release opening.

According to another aspect of the present disclosure, the operable seam is biased toward a closed position that encloses and area of the operable seam between the plurality of spray nozzles.

According to another aspect, the flexible spray head includes a base that is seated within an aperture of the rigid housing.

According to yet another aspect, a recirculating fluid flow system for an appliance includes a fluid pump that delivers process fluid and particulate material through a fluid path. A tub is disposed within a cabinet and that defines a processing space. The fluid path includes at least a portion of the processing space. The tub has an outlet that directs the process fluid and the particulate material toward the fluid pump. A sprayer assembly is coupled with the tub for directing the process fluid and particulate material from the fluid pump and into the processing space. The sprayer assembly includes a spray head having spray nozzles and an operable seam that extends through each of the spray nozzles. The operable seam is selectively separable to enlarge an aperture of any of the spray nozzles to define a release opening. The operable seam defines the release opening when a portion of the particulate material is larger than a corresponding aperture of the spray nozzles.

According to another aspect of the present disclosure, the spray nozzles are disposed within a flexible spray head that is operably positioned within a rigid housing.

According to another aspect, a bellows extends between the tub and the cabinet, wherein the sprayer assembly is disposed within a portion of the bellows.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A sprayer assembly for a laundry appliance, the sprayer assembly comprising:

a bellows that is configured to extend between a tub and an outer cabinet; and a flexible spray head that includes spray nozzles that are configured to spray a fluid into the tub, wherein the flexible spray head is disposed within the bellows, and wherein an operable seam extends through the flexible spray head and bisects each of the spray nozzles, wherein the operable seam separates to define a release opening when a blockage within process fluid is disposed within at least one of the spray nozzles.

2. The sprayer assembly of claim 1, further comprising:

a rigid housing that is disposed within the bellows, wherein the rigid housing receives the flexible spray head.

3. The sprayer assembly of claim 2, wherein the rigid housing includes a contoured portion that seats the flexible spray head and directs the spray nozzles in a direction that is configured to direct the fluid into the tub.

4. The sprayer assembly of claim 3, wherein the flexible spray head includes a base that is seated within an aperture of the rigid housing.

5. The sprayer assembly of claim 4, wherein the aperture is defined within the contoured portion of the rigid housing.

6. The sprayer assembly of claim 2, wherein the rigid housing includes a light fixture that selectively illuminates a processing space defined within a drum.

7. The sprayer assembly of claim 1, wherein the flexible spray head is configured to provide for recirculation of process fluid having at least one blockage contained therein through the tub and the flexible spray head.

8. The sprayer assembly of claim 7, wherein the process fluid includes particulate material accumulated during a laundry cycle, and wherein the sprayer assembly is configured to allow passage of the particulate material through at least one of the spray nozzles and the release opening.

9. The sprayer assembly of claim 1, wherein the operable seam is biased toward a closed position that encloses an area of the operable seam between the spray nozzles.

10. The sprayer assembly of claim 1, wherein the operable seam extends continuously through each of the spray nozzles.

11. A sprayer assembly for an appliance, the sprayer assembly comprising:

a bellows; and a flexible spray head that includes a plurality of spray nozzles that are configured to spray a fluid into a tub attached to the bellows, wherein the flexible spray head is disposed within the bellows, and wherein an operable seam extends through the flexible spray head and bisects each of the spray nozzles, wherein the operable seam separates to define a release opening when a blockage within process fluid is disposed within at least one of the spray nozzles.

12. The sprayer assembly of claim 11, wherein the operable seam selectively defines the release opening when a blockage of the process fluid is disposed within at least one spray nozzle of the plurality of spray nozzles.

13. The sprayer assembly of claim 11, wherein the bellows includes a rigid housing that receives the flexible spray head.

14. The sprayer assembly of claim 13, wherein the rigid housing includes a light fixture.

15. The sprayer assembly of claim 13, wherein the flexible spray head includes a base that is seated within an aperture of the rigid housing.

16. The sprayer assembly of claim 11, wherein the process fluid includes particulate material accumulated during a laundry cycle, and wherein the sprayer assembly is configured to allow passage of the particulate material through at least one spray nozzle of the plurality of spray nozzles and the release opening.

17. The sprayer assembly of claim 11, wherein the operable seam is biased toward a closed position that encloses an area of the operable seam between the plurality of spray nozzles.

18. A sprayer assembly for an appliance, the sprayer assembly comprising:

a rigid housing that is disposed within a bellows, the rigid housing having an aperture that is defined within a contoured portion of the rigid housing; and a flexible spray head that includes a plurality of spray nozzles that are configured to spray a fluid into a tub attached to the bellows, wherein the flexible spray head is disposed within the contoured portion of the rigid housing, and wherein an operable seam extends through the flexible spray head and bisects each of the spray nozzles, wherein the operable seam separates to define a release opening when a blockage within process fluid is disposed within at least one of the spray nozzles.

19. The sprayer assembly of claim 18, wherein the operable seam selectively defines the release opening when the blockage of the process fluid is disposed within at least one spray nozzle of the plurality of spray nozzles.

20. The sprayer assembly of claim 19, wherein the process fluid includes particulate material accumulated during a laundry cycle, and wherein the sprayer assembly is configured to allow passage of the particulate material through at least one spray nozzle of the plurality of spray nozzles and the release opening.

* * * * *